United States Patent Office 3,437,896
Patented Apr. 8, 1969

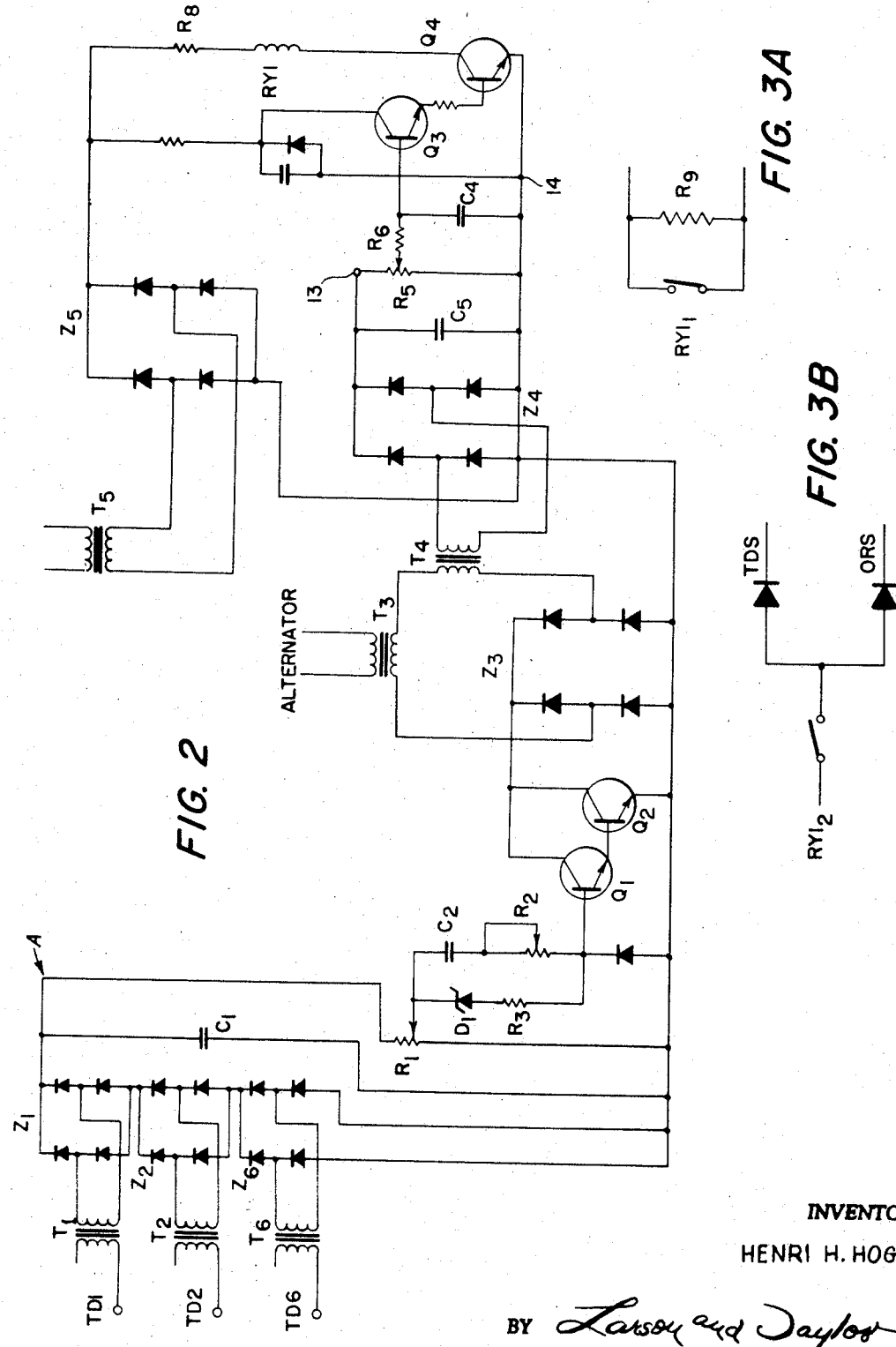

3,437,896
WHEEL SLIP DETECTION SYSTEM
Henri H. Hoge, Baltimore, Md., assignor to Summit Electronics Incorporated, Cambridge, Md., a corporation of Maryland
Filed July 5, 1966, Ser. No. 562,836
Int. Cl. H02p 5/46, 7/74, 7/80
U.S. Cl. 318—52                                        10 Claims

ABSTRACT OF THE DISCLOSURE

A highly sensitive wheel slip detection and correction signal generation system for locomotives wherein any slip of the locomotive wheels on the rails may be detected and corrected by reducing the excitation of the generator supplying electrical energy to the motors driving the wheels. The rate of acceleration of the slipping wheel determines the magnitude of the correction signal used to control the excitation of the main generator. Transductors connected between first and second sets of wheel and axle assemblies provide an electrical signal corresponding to wheel slippage. When the wheel slippage signal exceeds a predetermined value a relay is actuated which, among other functions, controls the application of sand to the rails.

---

The present invention relates to a wheel slip detection system for locomotives, more particularly, to such a system which has great sensitivity of response so that any slip of the locomotive wheels on the rails may be instantly detected and corrected by reducing the excitation of the generator supplying electrical energy to the motor driving the wheels.

Wheel slip results from loss of adhesion between the locomotive wheels and the rails and has been an existing problem dating back to the advent of railroading. Loss of adhesion which, in effect, is a decrease in the coefficient of friction between wheel and rail below that required to maintain a powered wheel in rolling contact with the rail, will result in slipping or sliding of the wheel on the rail. This problem is particularly acute in diesel-electric locomotives since when one or all of the individually powered axles of such a locomotive slips, there is often neither sufficient sound nor notice of loss of tractive effort to warn the engine man. A delay in correcting wheel slip may cause severe damage to locomotive equipment and track. Therefore, considerable work has been done to develop highly effective systems for detecting and correcting wheel slip on electrically driven locomotives.

While many different forms of wheel slip detection systems have been devised, such systems basically fall into two categories. In one category the speeds between two of the axles are compared and a warning device or sanding system is actuated whenever a predetermined speed differential exists between the compared axles. In the other category a parameter directly related to the speed of an axle is employed to actuate a detection system when a predetermined level is attained. In spite of the many different forms such systems have taken, the response of such systems is relatively slow so that an undesired lapse of time occurs between the detection of the slip and the application of corrective measures.

It is therefore the principal object of the present invention to provide a novel and improved wheel slip detection and correction system for locomotives.

It is another object of the present invention to provide a wheel slip detection and correction system for locomotives of considerably increased sensitivity.

The wheel detection system of the present invention is particularly adapted for electrical locomotives having a plurality of pairs of axle and wheel assemblies wherein each axle is driven by a separate traction motor. A generator is provided for supplying electrical energy to the traction motors and an excitation control system is employed to regulate the electrical energy supplied by the generator to the motor. The generator may also be provided with a shunt field circuit for additional regulation of the generator output of electrical energy. When, for example, the invention is applied to a locomotive having four individually driven wheel and axle assemblies with a pair of axle assemblies being arranged in a truck, transductors are connected between the corresponding motors of the pairs of wheel and axle assemblies. These transductors compare the current flow to the motors and produce a voltage output signal which is responsive to the current drop in a motor which is produced by any slip of the wheels. These voltage output signals are summed and electrical circuit means are provided for ascertaining the rate of change of the summed voltage output signal above a predetermined level. This rate of change is modulated and the modulated signal fed to the excitation control circuit to reduce the electrical energy supplied by the generator to the traction motors.

A shunt field circuit may also be provided for the generator. When the modulated signal is above a predetermined level the shunt field current is reduced to further reduce the electrical energy supplied by the generator. A sanding circuit may be provided on the locomotive and is responsive to the modulated signal concurrently with the reduction of the shunt field current so as to apply sand to the rails under the locomotive's wheels.

With the present arrangement when the wheel slip is relatively small and below a certain level the system is a rate of change system whereas when the wheel slip becomes relatively large the system is then a level system and, in addition, sand is applied to the rails to increase adhesion.

Other objects and advantages of the present invention will be apparent upon reference to the accompanying description when taken in conjunction with the following drawings wherein:

FIGURE 2 is a diagrammatic view of the electrical circuit showing the components of the wheel slip detection and correction system of the present invention;

FIGURES 3A and 3B are circuit diagrams of portions of the circuit of FIGURE 2 and showing the contacts of the vacuum switch RY1.

Proceeding next to the drawings wherein like reference symbols indicate the same parts throughout the various views a specific embodiment of the present invention will be described in detail.

Figure 1:
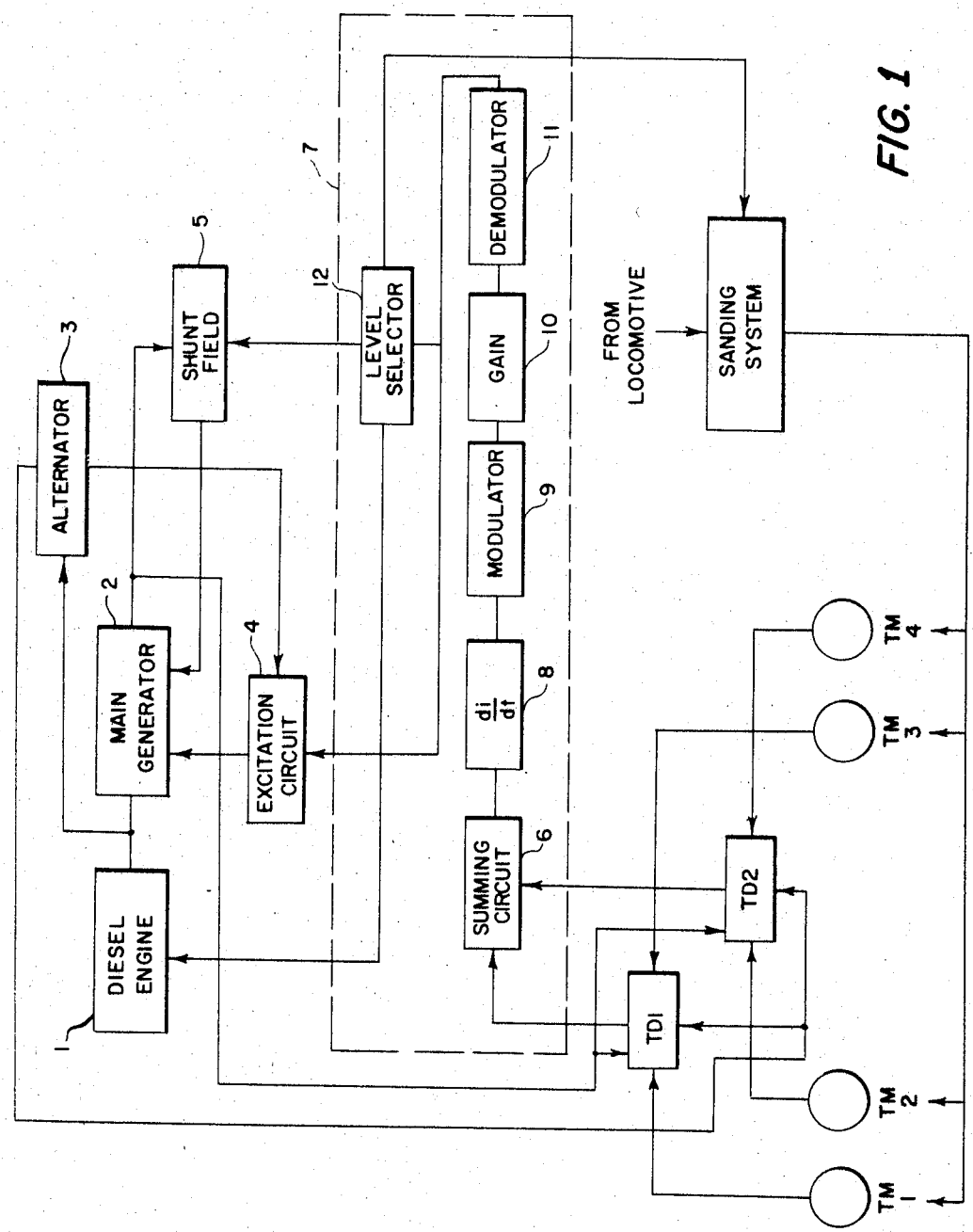
FIGURE 1 is a block diagram illustrating the wheel slip detection system of the present invention and its relationship to the power components of the locomotive.

As may be seen in FIGURE 1 the locomotive of the present invention is provided with a prime mover in the form of a diesel engine 1 which drives a main generator 2 to supply electrical energy to the traction motors TM1 through 4. Each traction motor is drivingly connected to an axle of a wheel and axle assembly. As will be apparent from FIGURE 1 the present embodiment is described for a four axle locomotive wherein pairs of axles are arranged in trucks.

The diesel engine 1 also drives an alternator 3 which provides electrical energy to an excitation control circuit 4 for the generator 2. Generator 2 is also provided with a shunt field 5 as is known in the art. The generator 2 drives traction motors TM1–TM4 through current transductors TD1 and TD2.

The term "transductor" is sometimes used to describe a conventional series saturable reactor arrangement. Thus transductor TD1 may comprise first and second parallel sets of single turn windings of opposite polarities connected in series between the main D.C. generator 2 and traction motors TM1 and TM3. The sets of single turn windings are wound on the same core as first and second "gate" or "power" windings connected in series with alternator 3 and with an output load. An increase in the current flowing from the generator 2 to the traction motors TM1 or TM3, such as caused by wheel slippage as explained hereinbelow, will be reflected in a corresponding decrease in the impedance in the load circuit and hence an increased output to a summing circuit 6. Reference may be made to the text by H. F. Storm entitled "Magnetic Amplifiers," published by John Wiley and Sons, chapter 7, p. 93, for further details regarding the transductors themselves.

As stated transductor TD1 compares the current flowing to TM1 with the current flowing to TM3. It is pointed out that the transductor compares the current flowing to correspondingly positioned traction motors on the truck. This is because the characteristics between the leading and trailing axles on a truck will be different because of weight distribution resulting from acceleration or deceleration of the locomotive. For this reason it is desirable to compare the current flowing to correspondingly positioned traction motors. In the event that the speed of TM1 would increase as compared to TM3 because of a slip of the wheels powered by TM1 the current to TM1 would drop. This drop in current would be at a rate responsive to the breakaway speed of the wheels powered by TM1. The drop in current will bias transductor TD1 so that there will be a voltage output signal whose amplitude is directly related to the drop in current of TM1. Further this rate of current decay will be directly related to the rate of wheel slip and thus provides an accurate indication of the slip.

It will be apparent that TD2 operates in a similar manner in comparing the currents of TM2 and TM4.

As stated hereinbefore, the output signal of TD1 (or as the case may be TD2) is fed to a summing circuit indicated at 6. The summing circuit is a component of the wheel detection and correction system enclosed in the dashed lines and indicated at 7. Summing circuit 6 sums up the voltages supplied from transductors TD1 and TD2. The fixed level of voltages from these transductors are blocked and only the rate of change of these levels as indicated at 8 is allowed to pass to a modulator 9. The modulator converts this rate component into a modulated signal which is stepped up by a transformer at 10, rectified at 11 and then fed to excitation circuit 4 to reduce the output of the main generator.

If the rate of change of the difference current is of a sufficient predetermined magnitude the rectified signal from 11 also actuates a control in the shunt field circuit 5 after being passed by level selector indicated at 12. This further reduces the output of electrical energy from the main generator.

Simultaneously a signal is fed to the locomotive sanding circuits in order to apply sand to the rail under the wheels. An additional signal may be applied to the overriding solenoid on the load regulator for the prime mover in order to prevent an overshoot in power when generator excitation is reapplied.

Shunt field control is effected through the use of a vacuum relay in a manner to be presently described which relay can be actuated in less than 20 milliseconds. The minimum gain of this system can be defined as the minimum rate of change of transductor signal required to completely reduce generator excitation. Rates as low as 20 amps per second will completely reduce generator excitation.

The wheel detection system per se denoted 7 and enclosed within dashed lines in FIGURE 1 is illustrated in detail in FIGURES 2 and 3. The system comprises input transformers T1, T2 and T6 (1:1) to isolate the transductor signals from the alternator circuit. On a 4 axle locomotive such as indicated on FIGURE 1 only two inputs are employed, i.e. T1 and T2, and the third input T6 is utilized for a six axle locomotive.

Rectifier bridges Z1, Z2 and Z6 which form the summing circuit 6 of FIGURE 1 rectify the corresponding signals which are then summed at A. The summed signal is filtered by capacitance C1 and the alternator ripple frequency is removed. At full engine r.p.m. this frequency is approximately 112 cycles per second. The gain of the system is varied by potentiometer R1.

Capacitor C2, which comprises the differentiator 8 of FIGURE 1, separates the steady state D.C. signal at A from the rate of change and is thus a D.C. blocking capacitor. The time constant of this rate circuit is adjusted by potentiometer R2. Any rate of change of the summed voltages at A is coupled through C2 and R2 to the base of transistor Q1.

As may be seen in FIGURE 2 transistors Q1 and Q2 form the active elements in a modulator consisting of rectifier bridge Z3 and transformers T3 and T4. Transformer T3 is connected to a suitable A.C. source which is preferably the alternator 3 as is indicated in FIGURE 2. In operation, the signal received at the base of Q1 is amplified and fed to the base of transistor Q2. The output of this modulator is fed to the primary winding of transformer T4 and stepped up by the turns ratio which, for example, may be 1:18.6. Transformer T4 thus corresponds to amplifier 10 of FIGURE 1. The stepped up modulated signal is then rectified by rectifier bridge Z4 and the resultant D.C. signal appears across capacitors C5 and potentiometer R5. This D.C. signal also appears across the terminals 13+ and 14—. These two terminals are inserted in the feed back system of the locomotive in order to reduce excitation of the "battery field" of the main generator 2. The reduction in excitation is accomplished by adding this signal to the current and voltage signals that feed the P.L.R. circuit in the battery field circuit. To explain, it is noted that the diesel electric locomotive power is controlled by metering fuel to the engine in accordance with the setting of a throttle. The engine 1 can only supply a given amount of power for any throttle setting and where the electrical load exceeds this amount, the engine 1 may be stalled or operated inefficiently. An electrical potentiometer positioned by a servo-motor serves as part of the engine governor, the setting of the potentiometer being a measure of the amount of electrical load to which the main generator 2 can be subjected. An electrical power measuring network produces a signal (the current and voltage signals mentioned hereinabove) corresponding to the output of generator 2 which is compared to the signal produced by the setting of the load regulator potentiometer.

The generator excitation is controlled such that excitation is reduced when the load exceeds that corresponding to the setting of the load regulator. The "P.L.R. circuit" denotes a power limiting relay which controls the generator excitation in accordance with the value of the load regulator setting as compared with the value of the signal corresponding to the actual power output of the generator 2. Where a relay of this type is used, when the power output signal becomes greater than the regulator signal, the relay contacts will open and current flow through the magnetic windings used to excite the main generator 2 will cease. As the power output of generator 2 decreases due to decreased excitation the power limiting relay may be again energized such that current flow to the magnetic amplifier windings is increased with a resultant increase in generator excitation. Thus the power limiting relay will open and close as the output of the main generator 2 rises and falls about the "set point" established by the load regulator setting.

The portion of the load regulation arrangement described so far is conventional. However, in accordance with the invention, terminals 13 and 14 of FIGURE 2 are connected in the power limiting control circuit such that when there is slipping, the resultant signal produced thereby is introduced into the power limiting circuit and added to the signal corresponding to actual generator output so that the threshold at which the contacts of the P.L.R. circuit open and excitation is lowered is reduced by a factor related to the amplitude of the signal at terminals 13 and 14. The amplitude of this signal is, as stated, proportional to the acceleration of the slipping axle and thus the power to the axles will be reduced until this acceleration signal is itself reduced.

The potentiometer R5 corresponds to the level selector indicated at 12 in FIGURE 1 and is used to select the level at which the shunt field current is reduced. The combination of the resistor R6 and capacitor C4 is used to filter small variations in the voltage level across potentiometer R5 and to limit the operation of transistor Q4 which in turn limits the operation of the vacuum relay RY1. The components comprising transformer T5, rectifier bridge Z5 and transistors Q3 and Q4 make up the control circuit of the vacuum relay switch RY1. For normal operation of the slip detection system, where slipping of any of the wheels on the rails exists, a slip signal proportional to the rate of acceleration of an axle will appear across terminals 13 and 14 and will be fed to the excitation control circuits as explained hereinabove. If, however, the rate of slip is severe, the voltage appearing across terminals 13 and 14 will reach a value, depending upon the setting of potentiometer R5, which will cause transistor Q3 to conduct. Transistor Q3 will, in turn, render transistor Q4 conductive to complete a circuit including the secondary winding of transformer T5, rectifier bridge Z5 and relay coil RY1 thus energizing relay RY1.

Vacuum switch RY1 includes a first set of contacts $RY1_1$ illustrated in FIGURE 3A and a second set of contacts $RY1_2$ illustrated in FIGURE 3B. Connected across contact $RY1_1$ is a 1000 ohm resistance R9 which is inserted into the shunt field by contact $RY1_1$. The decay of the shunt field current is proportional to $L/R$ or inductance of the shunt field winding divided by 1000 ohms. Tests have indicated that this constant was 0.3 to 0.5 second corresponding to an inductance of 300 to 500 henrys.

The second contact set $RY1_2$ is normally open and is used to feed a 74 volt D.C. signal to the time delay sanding relay TDS which actuates a sanding circuit (not shown), to apply sand to the rail. A second output is connected to over-riding solenoid ORS which adjusts the load regulator on the diesel engine in such a way that when the excitation is re-applied to the generator, the total kilowatt output is at a level lower than that which existed before excitation was removed. If the excitation is re-applied for a time greater than, for example, 1 second the total output of the generator will rise to the normal level at an exponential rate.

The circuit as described above is characterized by having an extremely high sensitivity. Because of this high sensitivity small slips of the locomotive wheels will modulate the generator excitation circuits very rapidly and, as a result, only very small reductions in total power output are required to correct most all of the wheel slips which will occur. It is of course possible that when very bad rail conditions exist the wheel slip can build up to high amplitudes. In such a case the circuit comprising diode D1 and resistance R3 shown in FIGURE 2 will become operative. By way of example, diode D1 was selected to have a voltage rating of 12 v. If the voltage at the summing point A exceeds this value diode D1 will conduct and change this operation from a rate to a level sensing circuit. The current then passing through diode D1 and resistor R3 becomes the controlling current as supplied to the base of transistor Q1. A direct path through the circuit is then provided to terminal 13 and also to vacuum switch RY1. The circuit then produces a continuous signal to reduce continuously the excitation of the main generator. As the power supply to the slipping wheel is reduced and the slip of the wheel decreases the current difference will be reduced to a level so that the signal at the summing circuit A will be below the voltage rating of diode D1. The system will then revert back to a rate system as described above.

Thus it is apparent that the present invention has disclosed a simple yet effective wheel slip and correction system. Because of the high sensitivity of this circuit wheel slip can be rapidly detected and corrected without the necessity for reducing the power output to the low levels previously required. Thus wheel slip can be corrected with only small reductions in power output achieved by reducing the excitation of the generator by a modulated signal in response to wheel slip.

It will be understood that this invention is susceptible to modification in order to adapt it to different usages and conditions and, accordingly, it is desired to comprehend such modifications within this invention as may fall within the scope of the appended claims.

What is claimed is:

1. In a wheel slip detection and correction system for locomotives the combination comprising a plurality of electrical drive motors for driving a plurality of wheel and axle assemblies; generator means for supplying electrical energy to said electrical drive motors; an excitation circuit for controlling the electrical energy supplied to said motors by said generator means; sensing means for sensing the electrical current flow to said drive motors, for comparing the electrical current flow to said drive motors for at least first and second wheel and axle assemblies, and for producing an electrical output in accordance with the results of the comparison; means for producing a signal in accordance with the rate of change of said electrical output; and means connecting said rate of change signal into said excitation circuit to control the output of said excitation circuit in accordance with said rate of change signal and to thereby control the electrical energy supplied to said electrical drive motors.

2. A system as claimed in claim 1 further comprising additional means for controlling slipping of the wheels, said additional means being responsive to the amplitude of the electrical output of said sensing means and providing control of slipping when said amplitude exceeds a predetermined level.

3. A system as claimed in claim 2 wherein said amplitude responsive means includes a relay.

4. A system as claimed in claim 2 wherein said amplitude responsive means controls a sanding circuit for applying sand to the rails beneath the wheels to reduce slipping.

5. A system as claimed in claim 2 further comprising a shunt field circuit for regulating the output of said generator means, said amplitude responsive means providing a control signal to reduce the current in said shunt field circuit to thereby reduce the electrical energy supplied to said motors by said generator means when said amplitude exceeds said predetermined level.

6. A system as claimed in claim 5 wherein said shunt field current reducing control signal is terminated when the amplitude of said sensing means falls below said predetermined level, said system further including means for varying the level at which said shunt field current reducing signal is provided.

7. A system as claimed in claim 1 wherein said sensing means comprises at least one transductor connected between a first wheel and axle assembly and a second wheel and axle assembly.

8. A system as claimed in claim 7 further comprising isolation transformer means connected to the output of said at least one transductor and rectifying means for rectifying said transductor output, and wherein said rate of change signal producing means includes a capacitor.

9. A system as claimed in claim 7 wherein said system comprises a plurality of said transductors, said system further including summing means for summing the outputs of said transductors, means for modulating the rate of change signal and means for feeding said modulated rate of change signal to said excitation output control means.

10. A system as claimed in claim 7 further comprising an alternator connected to said at least one transductor and to said excitation circuit.

References Cited

UNITED STATES PATENTS

| | | | |
|---|---|---|---|
| 2,626,362 | 1/1953 | Johansson | 318—52 X |
| 2,848,262 | 8/1958 | Lillquist | 318—52 X |
| 3,183,422 | 5/1965 | Stamm | 318—52 |
| 2,402,403 | 6/1946 | Hines | 317—5 |
| 2,543,622 | 2/1951 | Edwards et al. | 318—52 |
| 3,093,399 | 6/1963 | Smith | 291—2 |

ORIS L. RADER, *Primary Examiner.*

B. A. COOPER, *Assistant Examiner.*

U.S. Cl. X.R.

291—2